Feb. 28, 1950   C. D. MAGNESEN   2,498,739
BEARING SEAL
Filed Jan. 17, 1946   2 Sheets-Sheet 1

INVENTOR.
CHARLES D. MAGNESEN
Harry N. Hitzeman
ATTORNEY.

Feb. 28, 1950     C. D. MAGNESEN     2,498,739
BEARING SEAL

Filed Jan. 17, 1946     2 Sheets-Sheet 2

INVENTOR.
CHARLES D. MAGNESEN
BY Harry N. Hitzeman
ATTORNEY.

Patented Feb. 28, 1950

2,498,739

UNITED STATES PATENT OFFICE 2,498,739

BEARING SEAL

Charles D. Magnesen, Chicago, Ill., assignor to Modern Design Products Company, Chicago, Ill., a corporation of Illinois Application January 17, 1946, Serial No. 641,803

3 Claims. (Cl. 286—11)

My invention relates to bearing seals and similar devices.

My invention relates more particularly to sealing devices or sealing means adapted to form a fluid seal between two relatively rotating parts.

Bearing seals of the type which I am about to describe are particularly useful in automotive fluid circulating pumps, refrigerator driving units and a large variety of other mechanisms wherein the housing, through which a shaft is directed, may contain a fluid which must of necessity be prevented from escaping about the rotating shaft which extends through the housing. While a large number of various constructions of bearing seals have been proposed, for the purposes described, such constructions have not generally been entirely satisfactory. In some of the most popular types of bearing seals the bearing nose or seal member is usually carried by a housing that is connected directly to a rotating shaft by means of a diaphragm, bellows or other flexible connector which is securely fastened to the shaft and to the bearing nose housing, so that the force of rotating the seal against the bearing surface must of necessity be conveyed through the flexible member of the ensemble. This, together with the other strains on this member, naturally tends to weaken this particular element of the assembly and greatly reduces the life of a bearing seal constructed in this general manner.

Another objection to the bearing seals at present on the market is the amount of room which is taken up by them and the manner in which they are installed, which frequently requires dismantling the entire shaft and removing the same to replace or repair a bearing seal which may have become broken or out of order.

The oil seals available for sealing against the leakage of liquids along a rotating shaft are not capable of performing the exacting high standards of operation required in present day machinery of every class because of the fundamental design, operating principles, and limitations on materials which can be used for component parts. Every engineer who has had any experience with oil seals knows that the present seals are not practical and that a new unit oil seal is a necessity.

Realizing that a piece of equipment is limited by the quality of the seal, a new, revolutionary, yet simple sealing unit has been developed, and under test. A different operating principle is used, a new design eliminates the undesirable features present in other seals, and the very latest materials developed for seal purposes are used.

Before describing this new seal and its advantages, it would be well to explain the principle used in present unit oil seals.

The operating principle used in practically all present day seals is to tightly clamp a resilient stationary flexible diaphragm around the rotating shaft by means of a garter spring or some kind of a flat stamped spring. The springs are supposed to keep clamping the diaphragm tight around the shaft. This takes up the wear that results from the diaphragm rubbing on the rotating shaft. In these units the diaphragm is either a specially treated leather or a rubber-like piece such as neoprene. The effectiveness depends on how tight the stationary piece can be clamped around the shaft. The tight fit always results in wearing a groove in the shaft as well as wearing the diaphragm. There is a high power loss due to friction, heat, and a deterioration of the diaphragm as the hot oil causes it to become mushy. Since the shaft becomes grooved, it is always necessary to remove and regrind the shaft, put in a new shaft, or replace the sleeve which is sometimes used on the shaft to take the wear, and replacing a seal is costly in time and labor.

Furthermore, these seals are only oil retainers and are not capable of sealing against any pressure. Possibly when new they may seal a little, but they are not an effective means, and the efficiency of the machine is reduced.

In the new oil seal unit which I have provided, a different principle is used throughout. It can be used in connection with a shaft running in a ball bearing or a shaft running in a sleeve bearing. This seal, which is a short, completely enclosed unit ready to be pressed into the same recess provided for the old oil seal, eliminates any wear whatsoever on the shaft. The two wearing surfaces, rotating and stationary, are built right in the unit.

The rotating surface is a cup-shaped member in which is housed or vulcanized a resilient washer such as neoprene or its equal. The resilient washer and cup-shaped ring fit tight against the inner race of the ball bearing or against a shoulder on the shaft when the unit is pressed into place. The friction between the bearing race or the shaft shoulder and the resilient washer causes the cup-shaped ring to rotate with the shaft. The contact also prevents any leakage at that point. No mechanical drive is necessary because friction is always great enough to insure rotation.

The stationary sealing ring which bears against the rotating ring is fastened by clamping or vulcanizing to a very thin flexible diaphragm which in turn is fastened on its outer periphery to the metal casings which encase the whole unit. The rubbing surface on the rotating ring and the stationary ring are finished as flat as possible, preferably optically flat, so that the radially sealing joint will be leakproof. The diaphragm is backed up by a spring which always keeps the sealing faces tight together even though wear may occur on them, or even though there may be shaft vibration or deflection. Since the diaphragm is very thin, it is necessary to prevent it from twisting. This is accomplished by using one or more, preferably two, flat spots on the outside diameter of the sealing ring affixed to the diaphragm and a small metal stationary disc having a hole of the same shape but a few thousandths of an inch larger, which engages the sealing ring in a sliding fit, thereby preventing buckling or twisting of the diaphragm.

Any wear that takes place is not on the shaft, but in the seal itself. If at any time the seal must be replaced, it is easily removed and the shaft is not damaged in any way.

Installing the seal as described above results in sealing against the pressure. Tests so far have indicated that it is possible to seal effectively against fifty pounds' pressure and possibly more if a stronger spring is used in the unit.

If the unit is reversed in its installation procedure, which brings the cup-shaped ring and resilient washer to the outside, a collar must be placed against the resilient washer and fastened to the shaft. The collar then serves the same purpose as the ball bearing race or the shaft shoulder in the other installation. In this installation the internal pressure acts with the spring instead of against it. In tests, an effective seal has been maintained at five hundred pounds' pressure. The diaphragm cannot blow out because the thin metal disc which prevents the diaphragm from twisting is so designed to act as a backing for the diaphragm, preventing it from blowing out.

As mentioned, high speeds wear out the other seals and shafts quickly. This is because only certain materials can be used which are not suitable for high shaft speeds. In my new seal various materials can be used for the sealing rings, stationary and rotating, depending on the operating conditions. On ordinary jobs, hardened steels can run against bearing bronze. On more severe jobs, a special carbon sealing ring running against either hardened steel or high grade cast iron can be used. The carbon-steel combination or carbon-cast iron are the best available combinations known today.

The principal object of the present invention is to provide an improved bearing seal in the form of a cartridge or compact unit capable of being pressed over the shaft upon which it is to be mounted and the installation is completed.

A further object of the present invention is to provide a bearing seal in the form of a unit which is capable of being installed by simply placing the same over a shaft upon which it is to be mounted with a friction engaging element capable of contacting either a shoulder on the shaft; or in the case of sealing ball or roller bearings, frictionally engaging against the side of the inner race of the same.

A further object of the present invention is to provide in a compact unit, a bearing seal of the type wherein the flexible member which thrusts the bearing nose against the bearing surface under resilient pressure is not subjected to the strain of being the vehicle through which the entire bearing seal ensemble is rotated.

A further object of the present invention is to provide an improved structure of the type described wherein in a single compact housing, both the rotatable and the stationary parts of the sealing member are enclosed.

A further object of the present invention is to provide an improved structure of the type described wherein the flexible member of the ensemble is used only to permit the necessary movement longitudinally of the shaft, so that sufficient force may be exerted on the bearing nose to make an effective seal against a bearing surface.

A further object of the invention is to provide as a cartridge or compact unit an oil bearing seal which is capable of withstanding upward of five hundred pounds of oil pressure against the same without breaking or becoming out of order.

Other objects and advantages will be more apparent from the following description wherein reference is had to the accompanying two sheets of drawings, upon which Fig. 1 is a fragmentary sectional view of a housing within which a rotatable shaft is mounted in a suitable ball bearing mounting with my improved bearing seal positioned adjacent the bearing;

Figures 1, 2, 3:
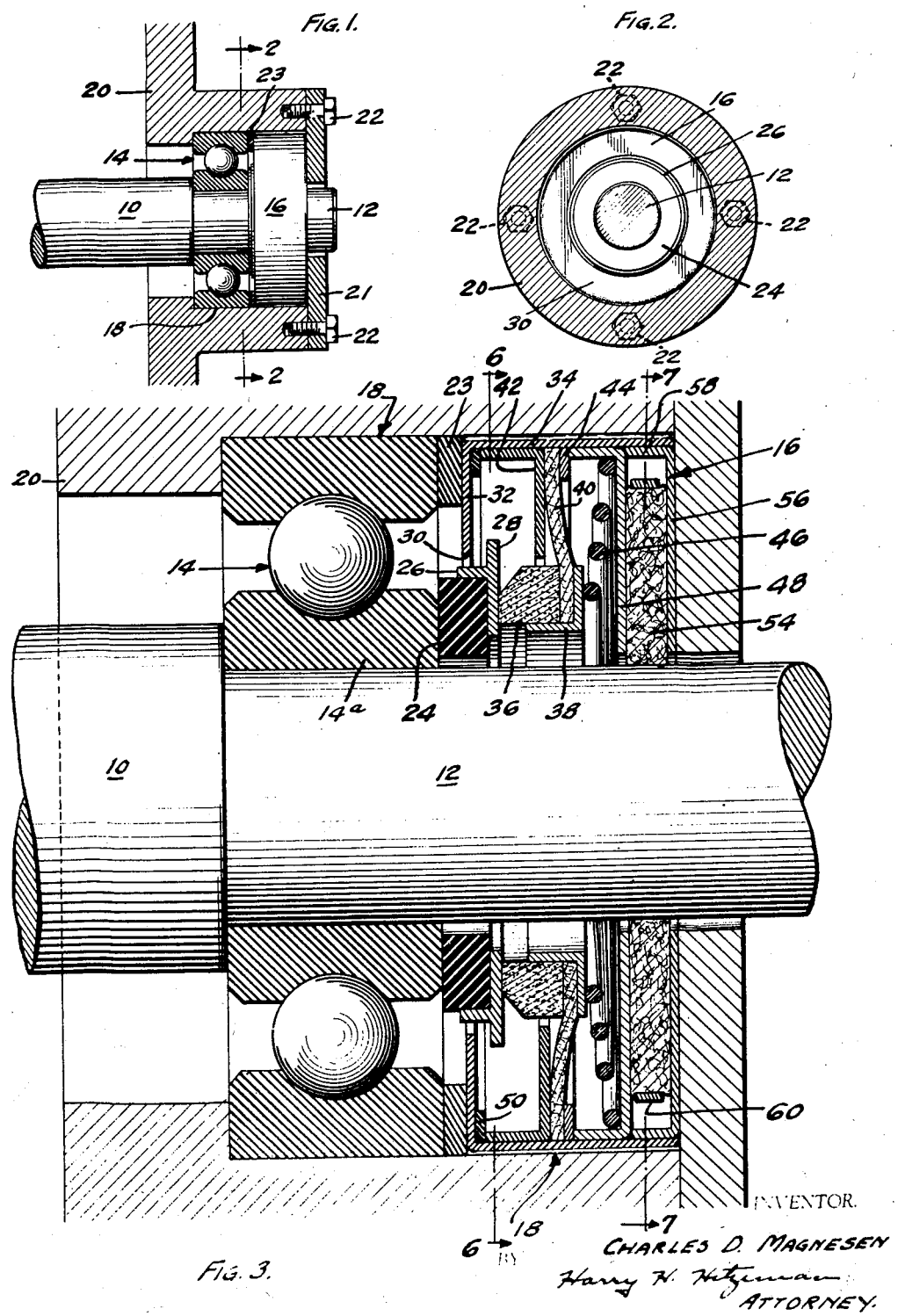
Fig. 2 is a vertical sectional view thereof taken on the line 2—2 of Fig. 1.
Fig. 3 is an enlarged sectional view taken on the plane of Fig. 1, showing the bearing seal in a sealing position.

In the embodiment of the invention which I have chosen to illustrate, I have shown a rotatable shaft 10 having a reduced portion 12 that extends through a ball bearing assembly 14 into a sealing unit 16. The ball bearing assembly and the sealing unit may be mounted in a bore 18 of a housing 20 within which fluid under pressure may be present. The bearing race may be a drive fit in the bore while the sealing unit fits loosely as shown. A cover plate 21 may be placed over the opening 18, pressing the bearing seal tightly against a compressible gasket 23, and be fastened to the housing by means of set screws 22.

Referring now in more detail to the construction of the bearing seal and associated units, in Fig. 3 I have shown an enlarged view of these parts. I provide a friction drive member 24 in the form of a washer, preferably of rubber or similar material. This member may be mounted in the cup-shaped ring 26 which is provided with a shoulder 28 and normally extends through the cylindrical opening 30 in the front wall 32 of the bearing seal housing 34.

Both the drive member 24 and the ring 26 have an axial opening therethrough sufficiently large to fit loosely over a shaft extending therethrough. The sealing ring 36, preferably made of carbon or similar substance, may be secured by a thimbleshaped holder 38 to a flexible diaphragm 40. These three elements are preferably secured together by clamping or vulcanizing so that they act as a unit. The diaphragm 40 may be circular and have its outer edge clamped between a diaphragm support member 42 and a backing ring 44. A coiled spring 46 is positioned within a spring retainer 48 in the housing 34 with the inner coils of the spring bearing against the lateral wall of the thimble 38. A rubber gasket 50 may be interposed between the forward wall 32 of the housing 34 and the forward edge of the diaphragm support 42.

In order to prevent any twisting of the diaphragm, I have provided an opening 41 in the diaphragm support 42 which has a pair of flattened sides 43. The rotating ring 36 is also provided with the flattened sides 45 so that it may be extended through the opening 41 and by reason of the flattened sides engaging in the complementary opening, rotation of the diaphragm in the support will be impossible. Thus, the only wear upon the diaphragm will be that occasioned by flexing due to slight longitudinal movement of the shaft and bearing.

With the construction above described, a fluid-tight seal is obtained in the following manner: The friction drive washer 24 which bears against the inner race 14a of the ball bearing member is rotated therewith and carries with it the rotatable ring 26 which is preferably of bronze or similar material. The housing 34, which includes the compression spring 46 and the sealing ring 36, is held against rotation in the bore 18 by the cover plate 21 pressing the same against gasket 23. In this manner, as the shaft 12 is rotated and carries with it the rotating ring 26, a seal is obtained between the surface of the wall 28 of the ring 26 and the forward surface or nose of the stationary ring 36. Even though there is shaft vibration or deflection due to the pressure of spring 46, by reason of the mounting of the ring 36 on the flexible diaphragm 40, a constant seal will be obtained between the running surface of the rotating and stationary rings.

In order to prevent dust or dirt from entering a bearing, such for example, as in an installation on a tractor axle, or other place where dirt and dust are present, I have provided a dust eliminating means which may include a felt disc 54 positioned between the spring retainer 48 and a cup-shaped holder 56 which may have an inturned ledge 58 and be telescoped in the housing 34. The end of the housing may be spun in to assemble together all of the parts mentioned.

For the purpose of keeping a constant frictional engagement between the felt 54 and the shaft 12, I have provided a circular flat spring member 60 which is constantly frictionally urging the felt against the shaft, thereby eliminating any possibility of dirt or dust entering either the bearing seal or any other parts of the bearing or along the shaft.

Figure 4:
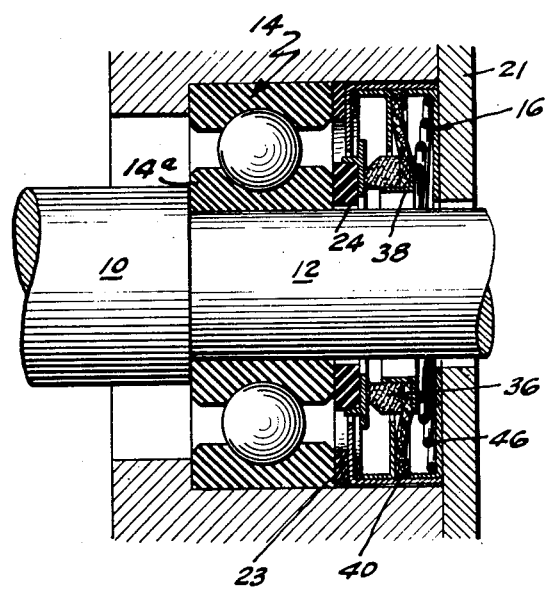
Fig. 4 is a fragmentary sectional view of a housing within which the bearing seal is mounted, the seal being of a slightly modified construction.

In Fig. 4 I have shown the bearing seal unit in a manner similar to Fig. 3, the only difference being that the felt disc 54 and its holder 56 have been eliminated.

Figure 5:
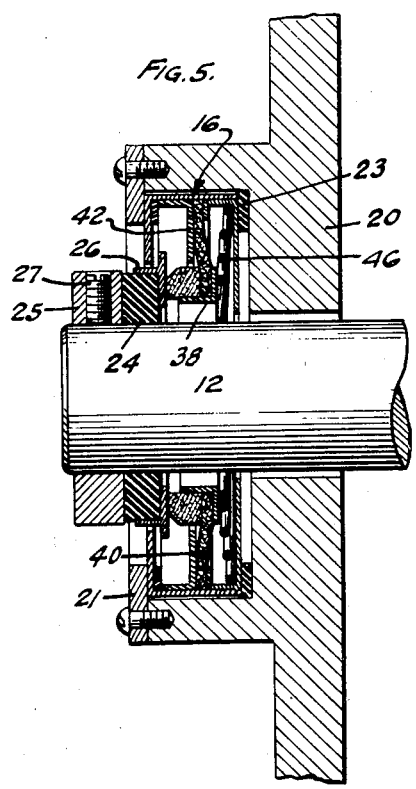
Fig. 5 is a fragmentary sectional view illustrating the manner in which the bearing seal is mounted to withstand extremely high oil pressures in a housing.
Figure 6:
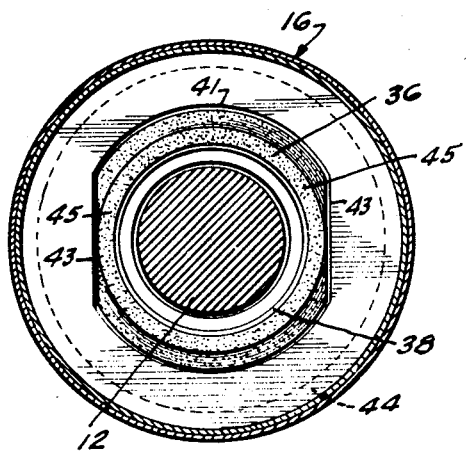
Fig. 6 is a vertical sectional view taken on the line 6—6 of Fig. 3.
Figure 7:
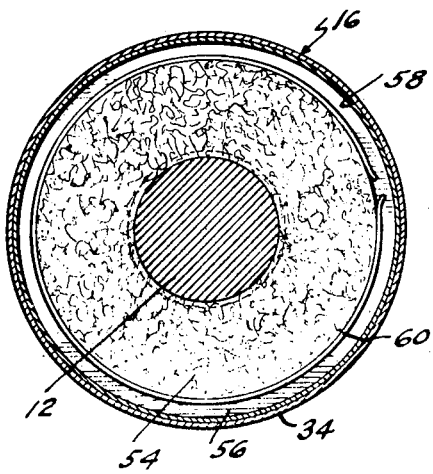
Fig. 7 is a similar sectional view taken on the line 7—7 of Fig. 3.

In Fig. 5 I have shown an installation in which the bearing seal unit 16 is reversed in its position, bringing the cup-shaped ring 26 and friction drive member 24 to the outside. I provide a collar 25 mounted upon the shaft 12 by a set screw 27. The collar 25 thus serves the same purpose as the ball bearing race 14a or shaft shoulder in the other installation. However, in this installation the internal pressure in the housing 20 will act upon the spring 46 instead of against the same, thus providing an effective seal which in tests has maintained a seal up to five hundred pounds' pressure. By reason of the diaphragm support 42, the diaphragm 40 cannot blow out, both because it prevents the diaphragm from twisting and also because it acts as a backing plate for pressure against the same.

From the above and foregoing description it will be apparent to those skilled in the art that I have provided an improved bearing seal which maintains a seal against positive internal pressure in the housing through which the shaft extends. Further, the pressure is not maintained by reason of any friction element rubbing against the shaft itself, and the only parts which can wear or need replacement are in the bearing seal unit.

While I have shown and described a preferred embodiment of the invention, it will be apparent to those skilled in the art that changes and modifications may be made in the exact details shown, and I do not wish to limit myself in any particular, rather what I desire to secure and protect by Letters Patent of the United States is:

1. A bearing seal unit comprising a cylindrical housing having end walls with an axial opening therethrough, said housing adapted to be telescoped over a shaft, a rotatable ring member extending axially through the opening in one end wall of said housing, said ring member adapted to frictionally bear against a radial surface substantially normal to and turning with the shaft, said ring member having a portion located in said housing and extending radially beyond the opening in one of the end walls of said housing, a non-rotating ring member within said housing axially and slidably engaging said rotatable ring member, a flexible wall fixedly mounted within said housing and supporting said non-rotating ring member radially, a backing plate forming part of said housing, and independent spring means arranged between said backing plate and said flexible wall to urge said non-rotating ring member against said rotatable ring member.

2. A bearing seal unit comprising a cylindrical housing having parallel end walls and an intermediate wall with an axial opening through all of said walls, said housing adapted to be telescoped over a shaft, a rotatable ring member extending axially through the opening in one side wall of said housing, said ring member adapted to frictionally bear against a radial surface substantially normal to and turning with the shaft, said ring member having a portion located in said housing and extending radially beyond the opening in one of the end walls of said housing, a non-rotating ring member within said housing axially and slidably engaging said rotatable ring member, a flexible wall fixedly mounted within said housing between said intermediate wall and the other end wall and supporting said non-rotating ring member radially, a backing plate forming part of said housing, and independent spring means arranged between said backing plate and said flexible wall to urge said non-rotatable ring member against said rotatable ring member.

3. A bearing seal unit comprising a cylindrical housing having parallel end walls and an intermediate wall with an axial opening through all of said walls, said housing adapted to be telescoped over a shaft, a rotatable ring member extending axially through the opening in one side wall of said housing, said ring member adapted to frictionally bear against a radial surface substantially normal to and turning with the shaft, said ring member having a portion located in said housing and extending radially beyond the opening in one of the end walls of said housing, a non-rotating ring member within said housing axially and slidably engaging said rotatable ring member, a flexible wall fixedly mounted within said housing between said intermediate wall and the other end wall and supporting said non-rotating ring member radially, a backing plate forming part of said housing, and independent spring means arranged between said backing plate and said flexible wall to urge said non-rotatable ring member against said rotatable ring member, said rotatable ring member including a cup-shaped cylindrical container having a peripheral flange located within said housing and a friction drive ring mounted in said container.

CHARLES D. MAGNESEN.

REFERENCES CITED

The following references are of record in the file of this patent:

UNITED STATES PATENTS

| Number | Name | Date |
| --- | --- | --- |
| 1,950,852 | Kuehn et al. | Mar. 13, 1934 |
| 2,163,127 | Limpert | June 20, 1939 |
| 2,279,669 | Friskney | Apr. 14, 1942 |
| 2,342,955 | Meyer | Feb. 29, 1944 |
| 2,393,260 | Pardie | Jan. 22, 1946 |
| 2,404,610 | Abell | July 23, 1946 |